(12) United States Patent
Radier et al.

(10) Patent No.: US 12,335,338 B2
(45) Date of Patent: Jun. 17, 2025

(54) METHOD FOR PROCESSING A DATA TRANSPORT SERVICE

(71) Applicant: Orange, Issy-les-Moulineaux (FR)

(72) Inventors: Benoît Radier, Châtillon (FR); Gaël Fromentoux, Châtillon (FR); Arnaud Braud, Châtillon (FR); Vincent Messié, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 184 days.

(21) Appl. No.: 18/040,573

(22) PCT Filed: Jul. 12, 2021

(86) PCT No.: PCT/FR2021/051292
§ 371 (c)(1),
(2) Date: Feb. 3, 2023

(87) PCT Pub. No.: WO2022/034273
PCT Pub. Date: Feb. 17, 2022

(65) Prior Publication Data
US 2023/0283664 A1 Sep. 7, 2023

(30) Foreign Application Priority Data
Aug. 10, 2020 (FR) ...................................... 2008388

(51) Int. Cl.
*H04L 67/1097* (2022.01)
*H04L 67/567* (2022.01)
*H04L 67/63* (2022.01)

(52) U.S. Cl.
CPC ........ *H04L 67/1097* (2013.01); *H04L 67/567* (2022.05); *H04L 67/63* (2022.05)

(58) Field of Classification Search
CPC .... H04L 67/1097; H04L 67/567; H04L 67/63
(Continued)

(56) References Cited

U.S. PATENT DOCUMENTS

| 7,975,061 B1* | 7/2011 | Gokhale | G06F 3/0665 |
| | | | 709/239 |
| 10,673,716 B1* | 6/2020 | Sethuramalingam | ........................ |
| | | | G06F 16/9024 |

(Continued)

OTHER PUBLICATIONS

International Search Report and Written Opinion dated Sep. 28, 2021 for Application No. PCT/FR2021/051292.
(Continued)

*Primary Examiner* — Anthony Mejia
(74) *Attorney, Agent, or Firm* — Knobbe, Martens, Olson & Bear, LLP

(57) ABSTRACT

A method is described for processing a data transport service in a virtual data space deployed on a communications infrastructure, the virtual data space comprising a plurality of sites each comprising a communication server, also referred to as a connector, capable of hosting a data item or an application for processing the data. The method is implemented by an optimisation entity capable of communicating with the connector and comprises receiving a request for deploying the data transport service from a data management agent; obtaining a connectivity parameter with respect to the communication infrastructure of a connector of a site among the plurality of servers, the connector contributing to the data transport service of the received request; and determining at least one data path in the virtual data space, the at least one path comprising an ordered series of connectors selected according to the obtained connectivity parameter.

15 Claims, 4 Drawing Sheets

(58) Field of Classification Search
USPC .......................................................... 709/219
See application file for complete search history.

(56) References Cited

U.S. PATENT DOCUMENTS

| | | | |
|---|---|---|---|
| 11,394,781 B1* | 7/2022 | Jacob Da Silva | .. H04L 61/5014 |
| 11,809,268 B1* | 11/2023 | Don | ...................... G06F 11/079 |
| 2005/0005116 A1 | 1/2005 | Kasi et al. | |
| 2008/0235355 A1* | 9/2008 | Spanier | ................... G06F 16/27 |
| | | | 709/219 |
| 2014/0201390 A1* | 7/2014 | Dalal | ................. G06F 12/0875 |
| | | | 709/250 |
| 2017/0142113 A1* | 5/2017 | Bourgeois | ............. G06F 16/178 |
| 2018/0254989 A1* | 9/2018 | Braddy | ................... H04L 43/14 |

OTHER PUBLICATIONS

International Data Spaces Association. "Reference Architecture Model Version 3.0", Apr. 30, 2019 (Apr. 30, 2019).

* cited by examiner

[Fig. 1]
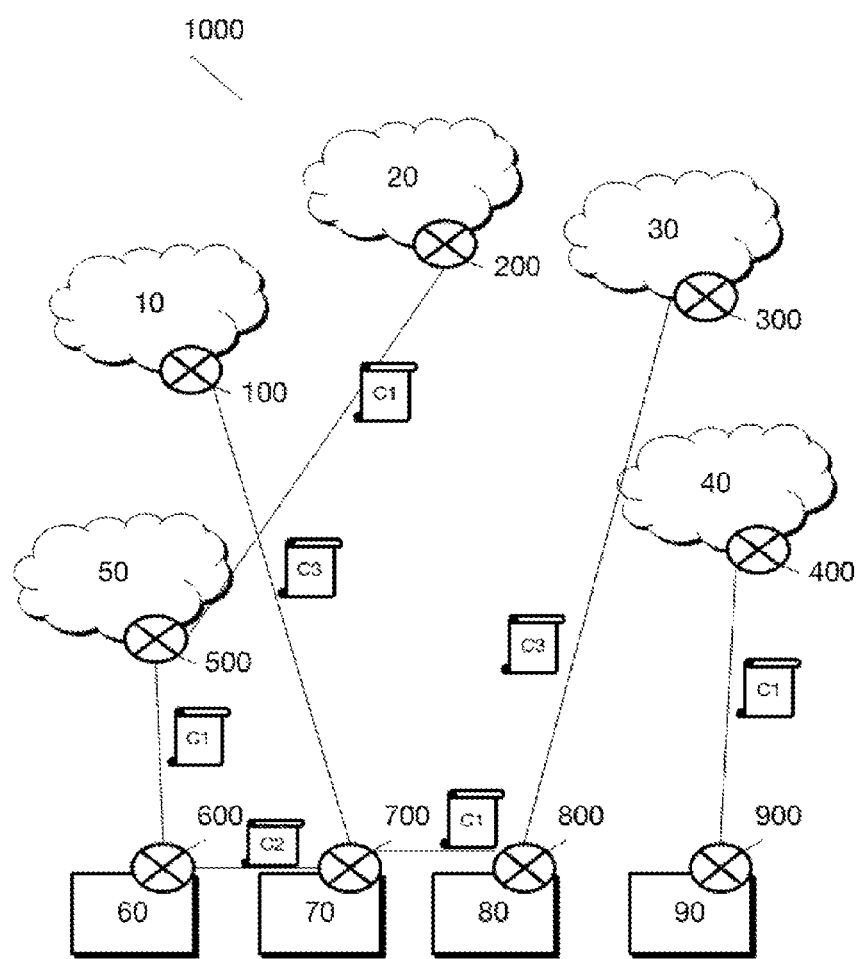

[Fig. 2]
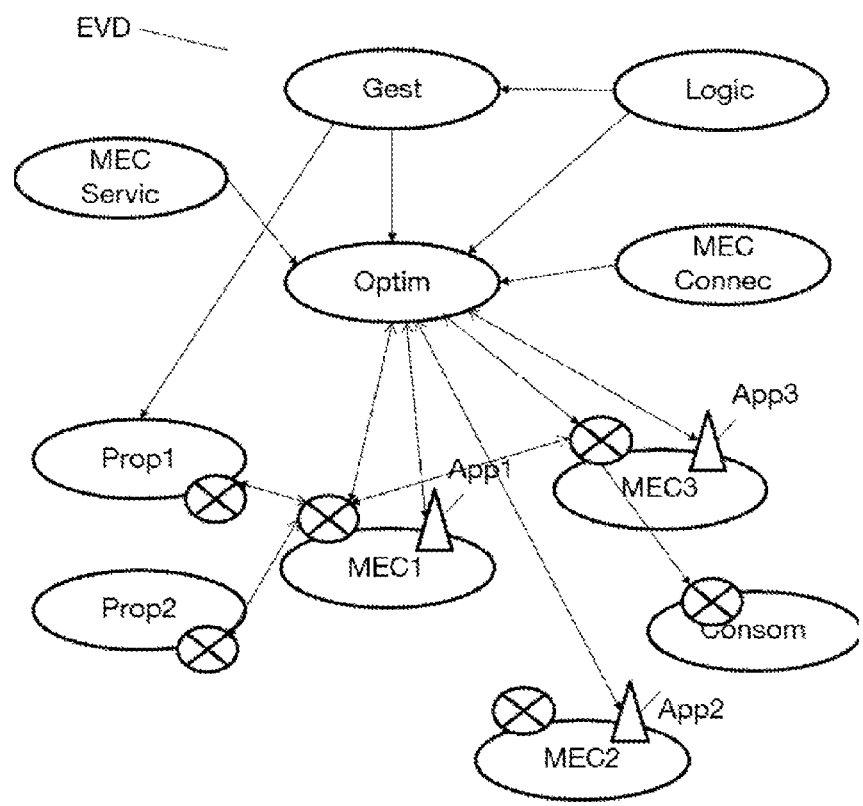

[Fig 3]
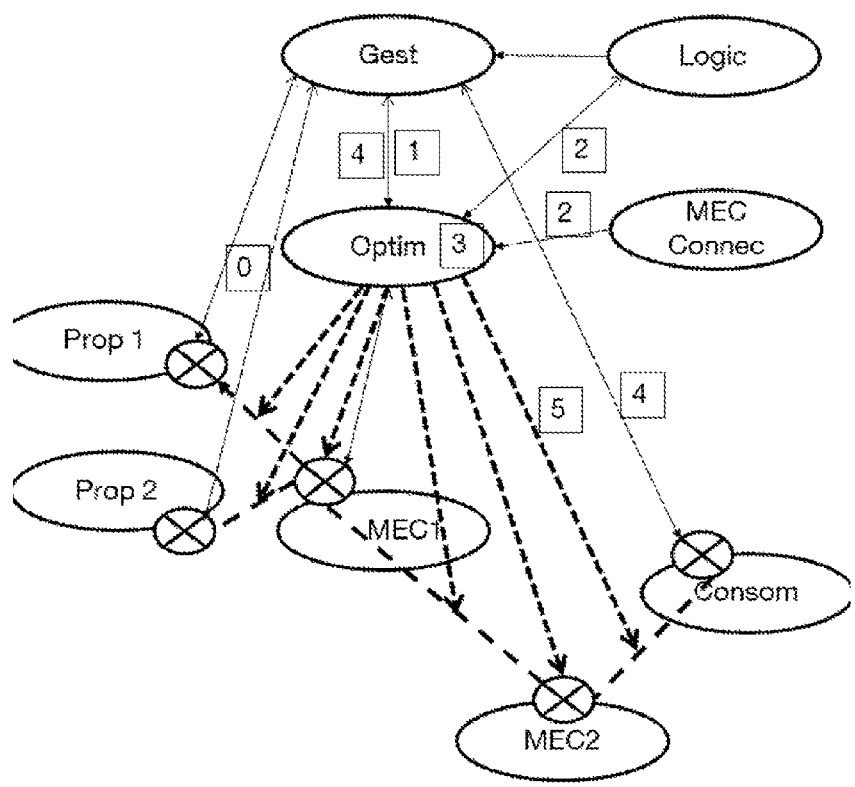

[Fig 4]
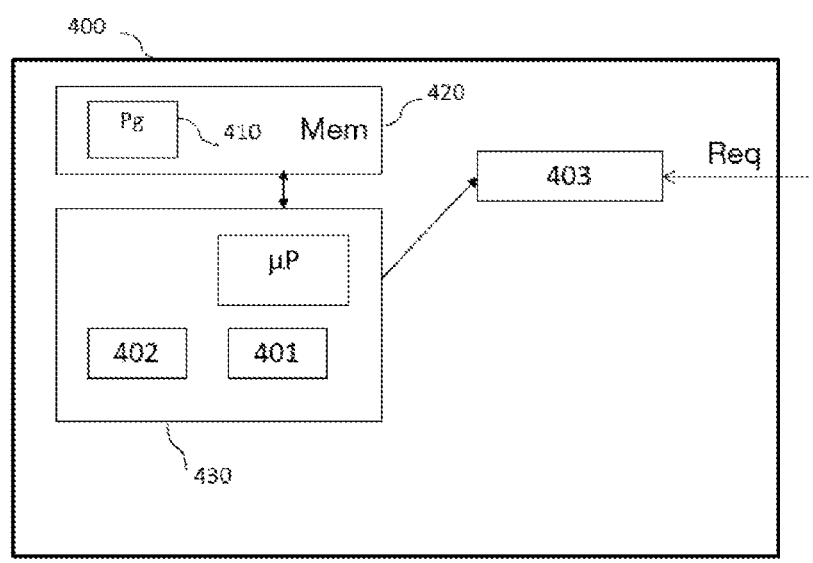

METHOD FOR PROCESSING A DATA TRANSPORT SERVICE

RELATED APPLICATIONS

This application is the U.S. National Phase of Application No. PCT/FR2021/051292 entitled "METHOD FOR PROCESSING A DATA TRANSPORT SERVICE" and filed Jul. 12, 2021, which claims the benefit of French Patent Application No. 2008388, filed Aug. 10, 2020, each of which is incorporated by reference in its entirety.

1. TECHNICAL FIELD

The invention relates to a communications infrastructure which makes it possible for a client to obtain a service developed on the basis of data originating from several storage spaces. The invention aims, more specifically, to make it possible to improve the quality of the service offered to the client by making it possible to route data between various entities in an optimized manner.

2. PRIOR ART

Providing services, relating to industrial, tertiary, medical or Internet-of-Things applications, increasingly relies on data being made available by distinct and various entities. Thus, application providers, security entities and communications network operators make their own data available for developing the service required by a client. Data are thus increasingly shared in data spaces which may cross borders and be deployed internationally. This data sharing must, however, be implemented in a context in which each entity wants to control its data and not leave its data to entities which do not have authorization, these data being available to be processed, utilized or provided to a third-party entity. Two conflicting objectives are therefore to be considered in the currently studied communications architectures: on the one hand, there is a need to make data available to enterprises while at the same time ensuring that the data made available are kept under the control of the owner of these data. A datum must therefore be routed in a fully confidential manner in a virtual data space comprising data servers of distinct partners. A virtual data space therefore defines a secure collaboration infrastructure in which data are exchanged in a fully confidential manner as each partner respects the same data control and exchange policies.

In order to specify a data exchange context, partners have thus initiated an IDSA (International Data Spaces Association) forum, which defines, notably in the document IDS Reference Architecture Model, an architecture and mechanisms for exchanging data between distinct entities. One of the cornerstones of such an architecture rests on certified "connectors" used to interconnect the various spaces maintained by the various partners. Thus, it is possible to deploy a virtual data space, corresponding in some way to a distributed cloud, in which each partner involved in the distributed cloud makes data which it possesses available for developing a service for a client. A connector is thus used to collect data and deposit them in a shared storage space for the members of the virtual data space, for example at the edge of a communications network. The virtual data space anticipates that each entity has available at least one connector which can communicate with the connectors of the other partners of the virtual data space. As the data exchange must be secure, each connector must be able to be identified and authenticated securely, and the connector of an entity must be able to ensure that data which it makes available are used by the other entities, and notably the client device, in accordance with the security features of the data as established by the respective service providers of the virtual data space. A connector can be integrated into an equipment either of a fixed network or of a mobile network. Once a connector has been identified, accepted and configured in the virtual data space and once it is notably known to a data broker agent, data exchange may proceed. A data consumer, also equipped with a connector, calls on the agent, or one or more data providers directly if it already knows them, to transfer, recover, transform or obtain data from the data providers. The data may themselves comprise information relating to the use policies for using these data and/or a general policy for data exchanged between a consumer and a provider for data exchanged between these two entities. It should be noted that making data available may be accompanied by making available applications used by connectors to process data on the basis of an application. Making applications available in the virtual data space is comparable to making data available if only for the fact the agent is identified as an applications store. A connector must therefore request an application from a store in accordance with its needs.

In the configuration information for connectors there is identification and communication information, notably IP addresses and communication ports which are used, but the connectors of the data and/or application providers communicate with the one or more data consumers and or applications in overlay mode, for example on the basis of tunnels, for example of TLS type, established on existing communications infrastructures or by using a protocol of HTTPS type. This does not make it possible, on the one hand, to establish a dynamic path between the connectors of the partners and, on the other hand, the inherent features of the communications networks, in terms of routing, quality of service and speed, are not taken into account for transferring data in a virtual data space. Data exchange in the space is thus not optimized and the service based on data exchange does not benefit from quality which is possibly suitable for the service consumed.

The object of the present invention is to make improvements with respect to the prior art.

3. DISCLOSURE OF THE INVENTION

The invention improves the situation using a method for processing a service for transporting data in a virtual data space deployed on a communications infrastructure, the virtual data space comprising a plurality of sites, each comprising a communication server, also called a connector, which is able to host a datum or an application for processing the data, the method being implemented by an optimization entity which is able to communicate with the connector and comprising:
- receiving a request to deploy the service for transporting data originating from an agent for managing the data,
- obtaining a parameter of connectivity to the communication infrastructure of a connector of a site from among the plurality, said connector contributing to the service for transporting the data of the request received,
- determining at least one path for routing the data in the virtual data space, the at least one path comprising an ordered series of connectors which are selected in accordance with the connectivity parameter obtained.

According to the prior art, a data consumer or client entity calls on a data agent to identify servers, also called connectors, in charge of hosting some of the data requested by the consumer and/or connectors comprising an application which is able to apply processing to the data called on. Then, the consumer entity calls on each connector to recover the data and apply the required treatment to them. The processing method advantageously improves this solution by taking advantage of the transmission or connectivity features of the communications infrastructure on which the virtual data space is deployed, but also by making it possible to transport the data between the various connectors in order to make it possible to recover the data and process them in a reduced time. Specifically, the method makes it possible to select connectors which have a connectivity feature which is suitable for the data transport service, but also to avoid duplicating data by taking advantage of a chaining of the connectors in the development of the path for transporting the data. On the other hand, updating the virtual data space by deploying, as needed, new sites and/or new connectors makes it possible to have available a virtual data space which is suitable for the needs of the consumers. The virtual data space may furthermore be better organized by making it possible for the most common data processing, expressed in the requests to deploy transport services received, to be carried out in the vicinity of the connectors comprising the data. These data made available during the preceding requests and offers are thus taken into account by the optimization entity for selecting functions for processing in connectors and for optimizing their placement if new functions are to be deployed for a request to deploy data transport. The optimization entity which implements the processing method is thus novel and inventive as it makes it possible to establish a routing path between various connectors, making it possible to avoid a data consumer connector being called on toward a plurality of processing application and/or data provider connectors. The method thus makes it possible to aggregate the various data originating from various connectors, to apply processing to these data or to some of these data as close as possible to the connectors where they are located and to route them along a path improving the quality of service of routing them by virtue of routing the data step by step between the connectors as far as the data consumer or the client which transmitted the request to deploy the transport service.

According to one aspect, the processing method further comprises obtaining at least one identifier relating to the service for transporting the deployment request received from among the following identifiers:
   an identifier of a connector of a site of a provider of a datum of the transport service,
   an identifier of a connector of a site of a consumer of the data of the transport service,
   an identifier of an application for processing a datum of the transport service,
   an identifier, according to a "separation of concern" data graph, of a datum of the transport service.

Obtaining identifiers from the data agent or, indeed, directly originating from the data providers and the data consumers, as far as these identifiers are concerned, makes it possible to determine the ordered series of connectors unambiguously, notably by using public identifiers such as FQDNs or IP addresses. Using a "Separation of Concern" data graph enriched with the identifiers of the connectors which route the data on the path makes it possible to ensure that the data have transited through connectors actually authorized to receive and process these data, guaranteeing that the data are not broadcast to unauthorized entities. The identifiers of the applications make it possible for the consumer of the data to know what types of processing have actually been carried out on the data received.

According to another aspect of the invention, in the processing method, the deployment request further comprises a rule associated with the policy for managing the data of the transport service.

A virtual data space makes it possible to exchange data between entities, and notably for a "consumer" entity to obtain data from various "providers", but the virtual data space must also make it possible notably to guarantee to the data provider that its data are not broadcast to unauthorized entities. The presence of rules which are associated with the data in the deployment request makes it possible for the entities which respond to this request to ensure that the rules are compatible with their policies for managing their data. The rules may correspond to retransmission rights, to rights making it possible to broadcast the data only in the context of the deployment request or, indeed, rules which authorize these data to be broadcast more widely to other entities.

According to another aspect of the invention, the processing method further comprises obtaining an identifier of a provider of connectivity to the communications infrastructure associated with the identifier of the provider or of the consumer of a datum of the transport service obtained.

Providing an identifier of a connectivity provider in addition to an identifier of a data provider authorizes, on the one hand, the identification graph to be completed with not only the identifiers of the providers and the consumers but also with the identifiers of providers of connectivity of the connectors to the infrastructure. Thus, a connector which benefits from connectivity with a provider ensuring a high level of security of its transport infrastructure can improve the confidentiality of the data routed in accordance with the rules associated with the policy for managing these data.

According to another aspect of the invention, in the processing method, the connectivity parameter comprises at least one transmission feature from among the following features:
   a time for a data packet to propagate between a connector and an access point of the communication infrastructure,
   a type of technology used for routing data between a connector and an access point of the communication architecture,
   a passband associated with a connector,
   a passband which is available for routing a datum of the transport service.

Various parameters of the connectivity of a connector to a communication infrastructure may be taken into account in order to ensure routing in accordance with the needs expressed, for example, in the deployment request. Thus, the time for a data packet to propagate, notably using packets of ICMP type, or information on the total passband or available passband, that is to say that which can actually be used for the data transport service, are particularly relevant. The type of technology (fiber, xDSL, 4G, 5G, etc.) used to attach a connector to the infrastructure gives information on the level of availability and of quality of the connection, on the latency as well as on the security mechanisms associated with the transport of the data.

According to another aspect of the invention, the processing method further comprises obtaining a software feature of an application required for the data transport service.

The data transport service comprises data, a path for routing the data and applications which process these data. The optimization entity can advantageously obtain, for example from a software broker, information relating to the licenses associated with the software used to process the data, processing times required for the data in accordance with the deployment request received, as well as features of the entities required to instantiate software in the event that new applications must be instantiated for the transport service. The features of the application may contain the information on the volume of data which must be transmitted to the application for the application to be able to perform this processing as well as the volume of data which the application must transmit. This information associated with the features of subscriptions to the data via the data management agent may be useful for determining the passband between the connectors and defining the quality of service which the connectivity operators must apply.

According to another aspect of the invention, in the processing method, determining the at least one path comprises identifying a connector which is able to accommodate an application for processing the data in the virtual data space in accordance with the deployment request received.

The optimization entity, in the determination step, identifies the connectors which are able to provide data and/or the entities which are able to carry out processing, for example using information obtained from the providers themselves or, indeed, using its own previously obtained data. The path determined to be the most suitable for guaranteeing a quality of service level required to route the data may require new connectors to be deployed, for example for deploying new processing applications. In this case, the optimization entity selects a connector to instantiate the application required, notably using the available connectivity parameters of the connector.

According to another aspect of the invention, in the processing method, determining the at least one path comprises selecting a new site which is able to accommodate a new connector, a connectivity feature of which is compatible with the virtual data space. In the event that no connector can be selected to provide the data transport service with the required quality, deploying new connectors, connected to the communications infrastructure according to connectivity parameters required to provide the data transport service, may be envisaged.

The virtual data space is thus updated dynamically with new connectors which can host data and/or applications in charge of processing these data.

According to another aspect of the invention, in the processing method, determining the at least one path comprises computing, for the at least one path, a parameter of the quality of data transport on the path. The determination step possibly makes it possible to identify several possible paths for transporting the data, and notably for the successive processing of these data on the paths. A path may be selected by a consumer of the data. In order to make this selection possible, the optimization entity may advantageously label each path determined with a transport quality parameter. For example, this may be a test data processing and routing time, it being possible for this time to result from a test carried out by the optimization entity on the various paths in order to calibrate them.

According to another aspect of the invention, the processing method further comprises transmitting a datum to a provider and/or data to a consumer from the at least one path.

A path may be selected by a consumer of the data in accordance with its own needs in terms of data transport quality or, indeed, by another entity in accordance with its objectives regarding its confidentiality objectives for the data transmitted, for example. The method may therefore comprise a step of sending, to an entity in charge of selection, the various paths, and possibly the information on the transport quality, on the connectivity of the connectors used for transport and on identifying the sites where the connectors are deployed, or even information on the software applying processing of the data.

According to another aspect of the invention, the processing method further comprises configuring the connectors of the path selected from among the at least one path determined.

Once the path has been selected, for example following information being received from the entity in charge of selection if this is the case, the optimization entity sets the path up. This instantiation may comprise configuring the circuit between the connectors and deploying new applications and/or new connectors. Knowing that the connectors are managed by the sites, and more specifically by the operators of these sites, the instantiation may advantageously be undertaken by calling on the various agents (brokers) of the (MEC) storage sites for the existing connectors or connectors to be deployed, the software agents for the new applications required, as well as the entities in charge of the infrastructure in order to ensure the connectivity of the connectors to this infrastructure. This instantiation may further comprise updating the data graphs comprising the information on the new circuit installed and which may possibly be used for other services if the quality of service and data confidentiality needs are compatible.

The various aspects of the processing method which have just been described may be implemented independently of one another or in combination with one another.

The invention also relates to a device for processing a service for transporting data in a virtual data space deployed on a communications infrastructure, the virtual data space comprising a plurality of sites, each comprising a communication server, also called a connector, which is able to host a datum or an application for processing the data, which is able to communicate with the connector and comprises:

a receiver, which is able to receive a request to deploy the service for transporting data originating from an agent for managing the data, an obtainment module, which is able to obtain a parameter of connectivity to the communication infrastructure of a connector of one site from among the plurality, said connector contributing to the service for transporting the data of the request received, a computer, which is able to determine at least one path for routing the data in the virtual data space, the at least one path comprising an ordered series of connectors which are selected in accordance with the connectivity parameter obtained.

This device, which is able to implement, in all its embodiments, the processing method which has just been described, is intended to be implemented in an entity for managing an application service or, indeed, in an entity for managing a telecommunications network, deployed on the basis of virtualized functions or of physical equipments.

The invention also relates to a system for processing a service for transporting data in a virtual data space deployed on a communications infrastructure, the virtual data space comprising a plurality of sites, each comprising a communication server, also called a connector, which is able to host a datum or an application for processing the data, said system comprising:

an optimization entity comprising a processing device and an agent for managing the data which is able to transmit a request to deploy the service for transporting data to the optimization entity.

The invention also relates to a computer program comprising instructions for implementing the steps of the processing method which has just been described, when this program is executed by a processor, and a storage medium which can be read by a determination device on which the computer program is stored. This program may use any programming language, and be in the form of source code, object code or of code which is intermediate between source code and object code, such as in a partially compiled form, or in any other desirable form.

The invention also targets a computer-readable information medium comprising instructions of the computer program as mentioned hereinabove.

The information medium may be any entity or device which is capable of storing programs. For example, the medium may comprise a storage medium, such as a ROM, for example a CD ROM or a microelectronic circuit ROM, or indeed a magnetic storage medium, for example a hard disk.

On the other hand, the information medium may be a transmissible medium such as an electrical or optical signal, which can be routed via an electrical or optical cable, by radio or by other means. The program according to the invention may in particular be downloaded from a network of Internet type.

Alternatively, the information medium may be an integrated circuit into which the program is incorporated, the circuit being suitable for executing, or being used in executing, the method in question.

4. BRIEF DESCRIPTION OF THE DRAWINGS

Other features and advantages of the invention will become more clearly apparent on reading the following description of particular embodiments, which are given merely by way of illustrative and non-limiting examples, and the appended drawings, among which:

FIG. 1 presents a simplified view of a communications infrastructure comprising a virtual data space in which a method for processing a data transport service may be implemented, FIG. 2 presents an overview of the method for processing a data transport service according to a first embodiment of the invention, FIG. 3 presents a method for processing a data transport service according to a first embodiment of the invention, FIG. 4 presents an example of a structure of a device for processing a data transport service according to another embodiment of the invention.

5. DESCRIPTION OF THE EMBODIMENTS

In the remainder of the description, embodiments of the invention in a communications infrastructure using routing means which are specific to a fixed network or to a mobile network. This infrastructure may be implemented to route communications data to fixed or mobile terminals and the invention may be intended to install virtualized functions used to route and/or process enterprise or residential client data.

Reference is first of all made to [FIG. 1], which presents a simplified view of a communications infrastructure comprising a virtual data space in which a method for processing a data transport service may be implemented. The communications infrastructure 1000 comprises a virtual data space comprising a plurality of data storage spaces. Among these data spaces, data spaces belonging to enterprises 60, 70, 80, 90 may be distinguished. These enterprises 60, 70, 80, 90 share, for example, data for implementing a service intended for a client not shown in [FIG. 1]. The data spaces may also be stored in cloud spaces such as the space 50. The data may also originate from marketplaces, that is to say from spaces where it is possible to store data originating from various entities, it being possible for these data to be made available to other entities. These marketplaces make it possible for entities to negotiate data acquisition. Entities may furthermore deposit data in spaces at the edge, such as the space 10 of the communications infrastructure, for example in distributed data spaces of MEC (Multi-access Edge Computing, as specified in https://www.etsi.org/technologies/multi-access-edge-computing) type. According to other embodiments, a data space 30 may be specific to an IoT (Internet of Things) service, or indeed to an enterprise cloud 40. The virtual data space, which makes it possible for a third-party entity to access data originating from several data spaces via the virtual data space, rests on a security architecture in order for a data provider to keep control of its shared data and them being processed, and for the third-party entity to have a guarantee on the origin of the data collected. Thus, each data space 10, 20, 30, 40, 50, 60, 70, 80, 90 comprises a communication server 100, 200, 300, 400, 500, 600, 700, 800, 900, also called a connector, which makes it possible to exchange data or to make them available to third-party entities (a client, another enterprise, institution, etc.). The virtual data space (EVD) involved must make it possible to exchange data securely between the various actors involved in these exchanges. These connectors are used to collect the data and transfer them, for example, into a shared storage space for the members of the virtual data space, for example at the network edge. This makes it possible for the members of the virtual data space to conduct their analyses locally without exporting their data but also to exchange them in accordance with rules established with acquirers. For example, the exchange rules make it possible to specify that a datum must not be exported but that the results of processing these data may be exported. The policies on broadcasting the data exchanged between the connectors, as well as the security (notably confidentiality) rules are thus associated with the data in a file comprising the constraints on using the data identified as C1, C2, C3 in [FIG. 1]. A data transport service may, for example, comprise the series of connectors 100, 700, 800, 300, and this data transport may comprise processing applications contained in some or all of the connectors in the series. The data of the connectors in the series may be labeled with constraints on using the data associated with each connector.

In relation to [FIG. 2], an overview of the method for processing a data transport service according to a first embodiment of the invention is presented. In [FIG. 2], a virtual data space EVD is shown. In this space EVD, an optimization entity Optim in charge of implementing the method for processing data of a transport service is deployed. This entity Optim may, for example, be implemented in a station for administering the virtual data space EVD.

This entity Optim has an entirely new and inventive role with respect to the existing IDSA architectures. Specifically, the purpose of this entity is notably to collect the information from the operators of the communications infrastructure on which the virtual data space EVD is deployed. Specifically, the various data spaces are interconnected by virtue of the resources of the communications infrastructure 1000, which is described, for example, in [FIG. 1]. This information on the connectivity of the data spaces to the communications infrastructure is advantageously taken advantage of in order to route the data in the virtual data space EVD. This information is used to optimize how the data are routed but also to optimize how they are processed, knowing that applications deployed in data spaces are used to apply processing to these data while they are being routed.

The virtual data space EVD further comprises entities which are specific to managing the data spaces of MEC type. Thus, the purpose of the entity MEC Connec is to search for the data spaces of MEC type (MEC1, MEC2, MEC3) which can actually host connectors of the virtual data space EVD. The entity MEC Servic is managed by a provider of connectivity services having connectors. The purpose of this entity is to control and recover the state of the connectivities used for the connectors. The information on the states of the connections between connectors may be collected from entities such as a PCF (Policy and Charging Function), an entity of NEF (Network Exposure Function) type or indeed an entity of NWDAF (Network Data Analytic Function) type for a mobile network, or indeed an entity of CLF (Connectivity Location Function) or RACF (Resource Admission and Control Function) type for a fixed network.

The virtual data space EVD further comprises an entity Gest corresponding to a broker agent or a marketplace, ensuring the offers and the requests originating from various entities (client entities wishing to acquire data, data providers) are managed. Thus, an entity Consom representing a data consumer or acquirer is contained in this virtual data space EVD.

The virtual data space further comprises 3 storage spaces MEC1, MEC2, MEC3, the identifiers and the respective connectivities to the communications infrastructure of which are managed by the entities MEC Connec and MEC Servic. The space MEC1 hosts, for example, data of the entities Prop1 and Prop2, which are owners of their own data. These MEC storage spaces are interconnected using the links implemented by the operators of the communications infrastructure on which the virtual data space EVD is deployed. It should be noted that these MEC spaces can also host applications, as is the case in [FIG. 2], where the spaces MEC1, MEC2 and MEC3 host the applications App1, App2 and App3, respectively. These data spaces further comprise connectors in charge of ensuring the data is exchanged between the various MEC spaces. The virtualized resources managed by the spaces may furthermore be administrated by an orchestrator.

An entity Logic is also contained in the virtual data space EVD and makes it possible to gather the features of the applications as well as the types of connectors which must be used to transport data in accordance, for example, with the constraints of the data request or with constraints which are specific to the data themselves.

By virtue of the information collected from the entities MEC Connec and MEC Servic, or even using the information provided by the function Logic, the function Optim can identify and locate the data as well as the location of the applications in charge of processing these data and required in the context of an offer to transport data. The information relating to the connectivity of the data spaces, such as the connectivities of the spaces MEC1, MEC2 and MEC3, are added to information which is specific to the object which describes the data required. These are, for example, described using the SOC data context graph, described in FIG. 3.30 of the document https://www.internationaldataspaces.org/wp-content/uploads/2019/IDS-Reference-Architecture-Model-3.0.pdf. Thus, to the information defined in an SOC graph according to the prior art, there is added connectivity information, such as termination points of the object (connectivity identifier), CLID (Calling Id identifier RADIUS) information, a termination point of the MEC space, a location, for example, with GPS coordinates or even a postal code, or even the identity of the operator which ensures the connectivity of the connector to the communications infrastructure is provided.

It should be noted that, according to another example, the entity Optim can also obtain the data relating to the connectivity of the connectors of the spaces MEC1, MEC2, MEC3 directly from the spaces MEC1, MEC2 and MEC3. Thus, the function Optim can furthermore obtain, from the operators providing the connectivity of MEC1, MEC2 and MEC3 to the communications infrastructure, additional information, comprising:

- the type of access used to connect a space MEC1, MEC2 and MEC3 to the communications infrastructure. For example, this may be xDSL access, fiber access or radio access (Wi-Fi, 4G, 5G).
- the service profile of the space MEC1, MEC2 and MEC3. For example, this may be a maximum volume of traffic, downlink/uplink transmission capacity, capabilities in terms of roaming, network slice identifiers and/or features.
- information relating to times of transmission between connectors as well as features of the passband used.
- features about the volume of traffic which will have to be exchanged (number of packets per second, volume of traffic, etc.).

The optimization entity Optim furthermore obtains information on the applications installed in the spaces MEC1, MEC2 and MEC3 in the managers of these respective MECs. The entity Optim may supplement the information obtained on the applications (type of application, latency of the applications, software version of the applications, etc.) with information obtained from the entity Gest and/or from the entity Logic.

The entity Optim processes the data obtained in order to identify the best path between connectors for routing the data and applying processing to them. It notably identifies where to instantiate an application required for a data transport service, notably in the event that no existing application in an MEC can accomplish the processing required or is sufficiently well placed for the service. The entity may furthermore identify where to place a new connector if no connector satisfies the service required. It furthermore identifies the features of the communications to be implemented between the connectors of the MECs participating in the service and it identifies the cost and quality of service from end to end of each path between connectors which is identified. Once these features have been identified, once an end-to-end path has been identified with, possibly, the processing applications required, the end-to-end path may optionally be selected or accepted by the requester and the entity Optim orchestrates the request with the various providers (managers of MEC1, MEC2 and MEC3, managers of the communication infrastructure in charge of the connectivity of MEC1, MEC2 and MEC3 to the infrastructure and the application providers if such needs are actually expressed).

In connection with [FIG. 3], a method for processing a data transport service according to a first embodiment of the invention is presented.

During a step E0, the owners Prop 1 and Prop 2 send an offer of data to the data manager Gest (or management agent) with context information associated with the data. According to one example, this context information is, for example, described in an SOC (Separation of Concerns) format. The purpose of the data manager Gest is to gather the offers of data and, on the other hand, to receive data transport service requests on the part of a requester, which may be a professional client seeking to collect, and possibly to process, data originating from various data providers, for example for data correlation needs or for conducting studies, typically of marketing type. This context information may, for example, comprise information on the location of the connectors which host these data and associated security rules, in accordance with the SOC description.

During a step E1, the data manager Gest transmits, to the optimization entity Optim, a request to deploy a service for transporting data in a virtual data space instantiated on a communications infrastructure. This request comprises the identifiers of the owners Prop 1 and Prop 2 as well as the connectivity identifiers of the space MEC1 and possibly of a connector of the space MEC1, in which the data of these owners are stored.

According to one example, the request further comprises the identifiers of the data consumers, for example of the entity Consom desiring to access the data transported, as well as the identifier of the space MEC2 and of a connector of the space MEC2, where the data received for the entity Consom will be stored.

According to another example, the request further comprises the identifiers of the applications in charge of applying processing to the data transported for the service under consideration. The request further possibly comprises the context information associated with the data, for example in a graph of SOC type, of the transport service. This context information comprises, for example, the IP addresses of the connectors which offer the data, the identifiers of the data, the rules associated with the policy for managing these data of the transport service, etc.

According to one alternative, the entity Optim furthermore obtains, from the entity Gest, identifiers of the connectivity providers associated with the connectivity identifiers of the spaces MEC1 and MEC2. These identifiers are notably used to join the connectors in the communications infrastructure.

According to another alternative, the entity Optim furthermore obtains, originating from the entity Gest, a volume of data of the transport service, a frequency at which the data are transmitted/received by the connectors and by the applications in charge of processing. According to one example, the entity Optim obtains, from the entity Logic, times taken to process the data by the applications which apply processing to the data transported. Moreover, the entity Optim can obtain, from the entity Gest, a list of applications which are already instantiated on the connectors during the previously instantiated implementations of transport services.

It should be noted that, according to one alternative, the entity Optim obtains all the information hereinabove not from the entity Gest but directly from the entities Prop 1, Prop 2 and Consom.

During a step E2, the connectivity service for the operators of the communications infrastructure, represented in [FIG. 3] by the entity MEC Connec, is interrogated by the entity Optim in order to obtain additional information, and notably connectivity parameters for the connectors which contribute to the service for transporting the data as defined in the request received. These connectivity parameters may, for example, comprise a time for a data packet to propagate between a connector and an access point of the communication infrastructure. The parameter may further comprise a time to propagate between two connectors which participate in the data transport service. The connectivity parameters may further comprise a technology type (xDSL, fiber, Wi-Fi, 4G, 5G, etc.) used to connect a connector to the communications infrastructure. The technology type may be separated into the type of transport technology (Ethernet, IP, LTE, etc.) and the transport infrastructure (fiber, copper, coaxial, Wi-Fi, etc.). A total passband (connectivity subscription profile (guaranteed maximum uplink/downlink, etc.)) associated with each connector, or even a passband which is available for routing the data of the transport service may also be obtained by the entity Optim. The connectivity parameters may further comprise a security protocol and/or technology used for communications between a connector and an access point of the communication infrastructure.

During the step E2, the entity Optim may furthermore obtain, from the entity Logic, the software features of the applications required for the service for transporting the data. These software features may comprise licenses associated with the applications, features of storage space to be used to deploy applications, or times to process the application data.

During a step E3, on the basis of the data collected and in accordance with the service for transporting the data which is required, the entity Optim determines at least one series of connectors, hosting data and applications, for implementing the data transport service requested. This determination requires the connectors which offer features of connectivity, of routing the data and of processing these data which are the most suitable for the request received to be selected. Notably, these connectors are selected in order to obtain the best QoS and/or the lowest cost, for example in accordance with a parameter which is present in the SOC. This determination, according to one alternative, may also comprise instantiating an application in an existing connector in order to limit the traffic to be exchanged, for example by instantiating applications as close as possible to the connectors where transported data are stored. This instantiation requires connectors in the vicinity of the data sources to be identified, for example on the basis of the information on the geolocation of the connectors which is transmitted by the entity Gest or the entity MEC Connec, or even the MECs themselves.

According to one example, the determination may also comprise implementing a new connector in the event that the existing connectors do not make it possible to obtain the QoS required or, indeed, if other connectors may improve the QoS. This implementation may be carried out by searching, among the MEC connectivity providers, for example by calling on the entity MEC Connec, for the MEC storage spaces which are compatible with the criteria, notably the security and confidentiality criteria, of the virtual data space.

During a step E4, according to one example, the entity Optim determines, for the various paths, which are each composed of a series of connectors, a parameter of the quality of transporting the data. Thus, during this phase E4, the suitability of the paths for transporting the data as required is determined. It may be a case, for example, of computing a QoS from end to end and a cost associated with transporting the data while respecting the rules on using the data and while taking into account the processing of the applications on the path. These paths may comprise new connectors and may also comprise new instantiated applications, this requiring the QoS for routing and processing the data of the service in the virtual data space to be evaluated.

The paths determined, and possibly the associated quality of service parameters, are transmitted to the entity Consom, and possibly to the entities Prop 1 and Prop 2. This sending makes it possible for these entities to select or, indeed, to eliminate one or more paths from the list. For example, the entity Consom may choose a path which has a good QoS, whereas an entity, such as Prop 1, may prohibit a path on account of the presence of a connector or of an application on the path which might compromise data. The entities Consom, Prop 1 and Prop 2 transmit their choice to the entity Optim in response to the call of the entity Optim.

During a step E5, once the path (or paths) has (or have) been selected by the entity Optim, possibly with the aid of the entities Consom, Prop 1 and Prop 2, the entity Optim install the path (or paths). This installation consists in installing the connections between connectors which provide and consume data, in instantiating, if necessary, applications for processing data, or even in instantiating new connectors. The entity Optim may install this (or these) path (or paths) autonomously or, indeed, by calling on the entities Logic, MEC Connec as well as the operators in charge of the communications infrastructure.

Reference is now made to [FIG. 4], which presents an example of the structure of a device for processing a data transport service according to another embodiment of the invention.

The device 400 for processing a data transport service implements the method for processing a data transport service, different embodiments of which have just been described.

Such a device 400 may be implemented in an entity for managing an application service or, indeed, in an entity for managing a telecommunications network, deployed on the basis of virtualized functions or of physical equipments.

For example, the device 400 comprises a processing unit 430, equipped, for example, with a microprocessor μP, and controlled by a computer program 410, which is stored in a memory 420 and implements the determination method according to the invention. On startup, the code instructions of the computer program 410 are, for example, loaded into a RAM memory, before being executed by the processor of the processing unit 430.

Such a device 400 comprises:
- a receiver 403, which is able to receive a request Req to deploy the service for transporting data originating from an agent for managing the data,
- an obtainment module 401, which is able to obtain a parameter of connectivity to the communication infrastructure of a connector of one site from among the plurality, said connector contributing to the service for transporting the data of the request received,
- a computer 402, which is able to determine at least one path for routing the data in the virtual data space, the at least one path comprising an ordered series of connectors which are selected in accordance with the connectivity parameter obtained.

By way of examples, implementations of such a processing method are presented hereinbelow.

A client of a logistics service desires to follow the movement of its cargo of products in storage spaces (ports/warehouses) and transport services (container carrier, delivery truck) and the state in which it is stored (smart (for example refrigerating) container hire)). The client thus needs to obtain the information on the location of its merchandise from the various transport services, the information on the state of its products via the sensors of its container from the container hire services, and the information on maintenance in the storage spaces via the entities in charge of the storage services. By correlating the data which are available to the various entities in charge of its products, the client may use applications to follow the location of its cargo as well as the state of its cargo in real time. As the various (transport, storage, cooling) service entities may be rendering their services to several clients, it is desirable to process the data locally for all of the clients, thus making it possible for only the data aggregated in the MECs by the various entities to be transferred to the clients. The processing may thus consist in identifying data, in correlating data with one another and in protecting data.

According to another example of an implementation, a pharmaceutical laboratory desires to analyze the data of the patients for a specific disease and it therefore needs to collect the data from various hospitals in various countries without knowing the identity of the patients. The applications hosted in connectors in the vicinity of the hospitals aggregate and analyze the data of the patients, taking care, for example, to delete the information relating to the identities of the patients. MECs located by country aggregate the data of the patients of a country, and the laboratory may thus aggregate the data from various countries while at the same time respecting the local constraints of each country, requiring specific processing for each MEC, and minimizing the transfer of data to its connector via suitable use of the communications infrastructures ensuring the connectivity of the MEC sites and processing as close as possible to the MEC sites of the various countries. Only the data which are relevant for the laboratory are processed and transmitted, furthermore taking advantage of the specificities of the communication infrastructures.

According to yet another example, a geomarketing company desires to analyze the behavior of a population of a smart city. It may thus subscribe to access data from transport services in order to know how frequented the transport lines are, from restaurant services (in order to know what the restaurant habits of the residents are), from parking services (in order to know what the parking habits are), from navigation assistance systems (in order to know what the customs of the roads (traffic lights, navigation assistance) are and how frequented they are), from communications services (in order to know the information on the communications of the residents), from entertainment services (in order to analyze the entertainments of the residents), etc. Each of these data providers may have already provided, via a virtual data space, for processing, data requested by their own clients. These providers deploy applications in MECs in the vicinity of their data sources (sensors). The processing method, implemented by an optimization entity, can identify the applications already installed in order to determine the data transport paths which correspond to the various clients and which optimize data transport.

Thus, for data originating from two distinct providers, preference will be given to resorting to an application, for example, for compressing data, taking into account the connectivities of the MEC spaces and of the space where the application is implemented. The data from the various providers will thus be routed on a path taking into account the connectivities of the data storage spaces and the spaces where these data may be processed optimally in order to satisfy the requirements in terms of quality of service and the cost of the service.

The invention claimed is:

1. A method for processing a service for transporting data in a virtual data space deployed on a communications infrastructure, the virtual data space comprising a plurality of sites, each comprising a communication server which is able to host a datum or an application for processing the data, the method being implemented by an optimization entity which is able to communicate with the communication servers, the method comprising:
   receiving a request to deploy the service for transporting data originating from an agent for managing the data,
   obtaining a connectivity parameter of connectivity to the communication infrastructure, of a communication server of a site from among the plurality, said communication server contributing to the service for transporting the data of the received request, and
   determining at least one path for routing the data in the virtual data space, the at least one path comprising an ordered series of communication servers which are selected in accordance with the connectivity parameter obtained.

2. The method of claim 1, further comprising obtaining at least one identifier relating to the service for transporting the deployment request received from among the following identifiers:
   an identifier of a communication server of a site of a provider of a datum of the transport service,
   an identifier of a communication server of a site of a consumer of the data of the transport service,
   an identifier of an application for processing a datum of the transport service, and
   an identifier, according to a separation of concern data graph, of a datum of the transport service.

3. The method of claim 1, where the deployment request further comprises a rule associated with the policy for managing the data of the transport service.

4. The method of claim 2, further comprising obtaining an identifier of a provider of connectivity to the communications infrastructure associated with the identifier of the provider or of the consumer of a datum of the transport service obtained.

5. The method of claim 1, where the connectivity parameter comprises at least one transmission feature from among the following features:
   a time for a data packet to propagate between a communication server and an access point of the communication infrastructure,
   a type of technology used for routing data between a communication server and an access point of the communication architecture,
   a passband associated with a communication server, and
   a passband which is available for routing a datum of the transport service.

6. The method of claim 1, further comprising obtaining a software feature of an application required for the data transport service.

7. The method of claim 1, where determining the at least one path comprises identifying a communication server which is able to accommodate an application for processing the data in the virtual data space in accordance with the deployment request received.

8. The method of claim 1, where determining the at least one path comprises selecting a new site which is able to accommodate a new communication server, a connectivity feature of which is compatible with the virtual data space.

9. The method of claim 1, where determining the at least one path comprises computing, for the at least one path, a parameter of the quality of data transport on the path.

10. The method of claim 1, further comprising transmitting a datum to a provider and/or data to a consumer from the at least one path.

11. The method of claim 1, further comprising configuring the communication servers of the path selected from among the at least one path determined.

12. A device for processing a service for transporting data in a virtual data space deployed on a communications infrastructure, the virtual data space comprising a plurality of sites, each comprising a communication server which is able to host a datum or an application for processing the data, the device able to communicate with the communication servers, the device comprising:
   a receiver able to receive a request to deploy the service for transporting data originating from an agent for managing the data,
   an obtainment module able to obtain a connectivity parameter of connectivity to the communication infrastructure of a communication server of one site from among the plurality, said communication server contributing to the service for transporting the data of the request received, and
   a computer able to determine at least one path for routing the data in the virtual data space, the at least one path comprising an ordered series of communication servers which are selected in accordance with the connectivity parameter obtained.

13. A system for processing a service for transporting data in a virtual data space deployed on a communications infrastructure, the virtual data space comprising a plurality of sites, each comprising a communication server which is able to host a datum or an application for processing the data, said system comprising:
   an optimization entity comprising the processing device of claim 12, and
   an agent for managing the data which is able to transmit a request to deploy the service for transporting data to the optimization entity.

14. A computer comprising a processor and a memory, the memory having stored thereon instructions which, when executed by the processor, cause the processor to implement the method of claim 1.

15. A non-transitory computer readable storage medium having stored thereon instructions which, when executed by a processor, cause the processor to implement the method of claim 1.

* * * * *